Nov. 8, 1932.   O. H. WURSTER   1,886,444
SIGHT FLOW GLASS
Filed Aug. 26, 1931   2 Sheets-Sheet 1
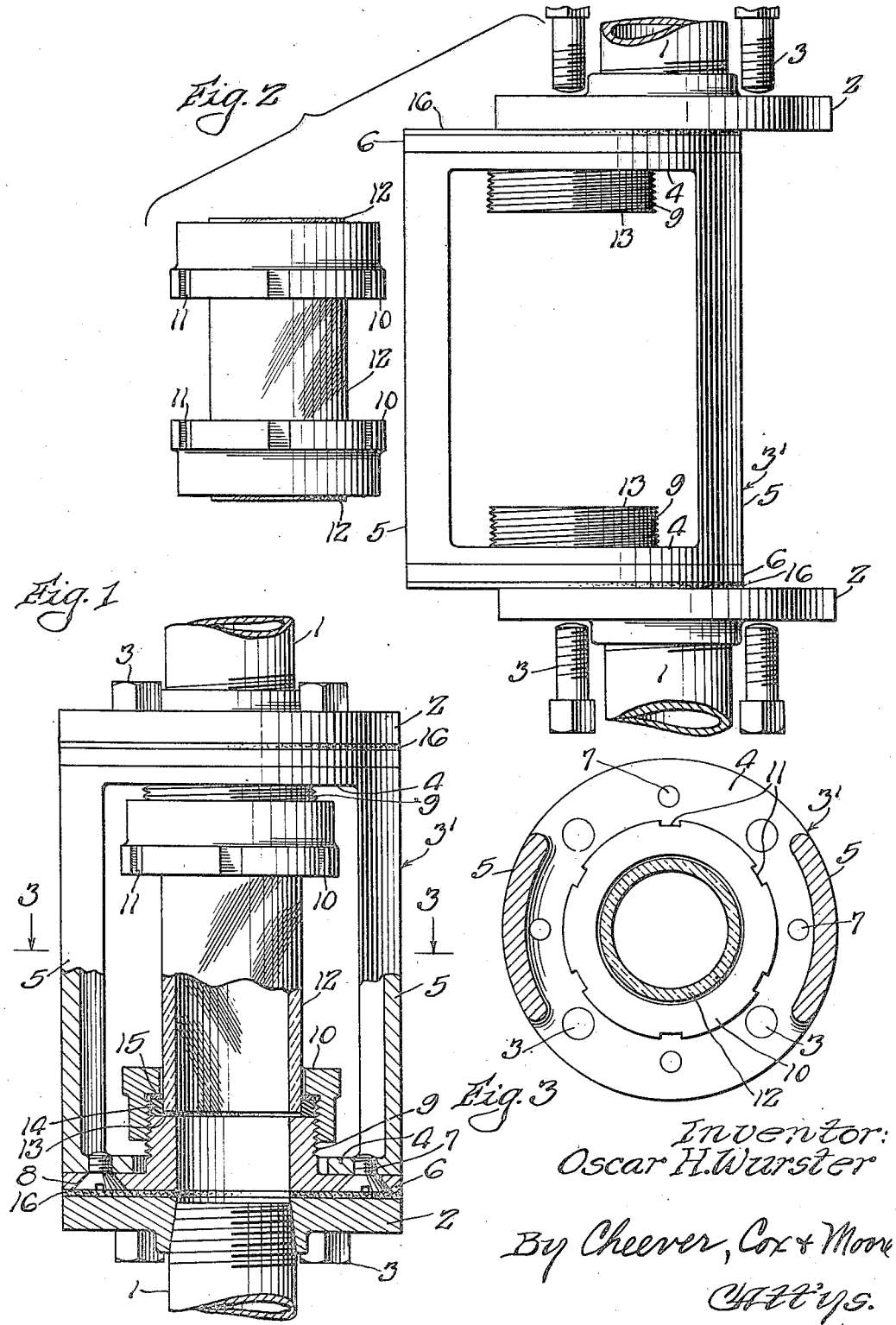
Inventor:
Oscar H. Wurster
By Cheever, Cox & Moore
Attys.

Nov. 8, 1932.   O. H. WURSTER   1,886,444
SIGHT FLOW GLASS
Filed Aug. 26, 1931   2 Sheets-Sheet 2

Inventor:
Oscar H. Wurster

By Cheever, Cox & Moore
Attys.

Patented Nov. 8, 1932

1,886,444

UNITED STATES PATENT OFFICE

OSCAR H. WURSTER OF CHICAGO, ILLINOIS

SIGHT FLOW GLASS

Application filed August 26, 1931. Serial No. 559,521.

The present invention relates to a sight flow glass which enables one to see the flow of fluids through pipe lines and conduits.

One object of this invention is to provide a sight flow glass in which the transparent portion may be readily removed for cleaning or replacement and without the necessity of dismantling the entire sight flow glass or taking apart the pipe line to which it is attached.

Another object of this invention is to provide a strong, substantial and rigid fitting to hold the transparent tubular glass in place, the said fitting having a strength approximately equal to or greater than the pipeline or conduit in which the same is placed.

Another object is to provide a tubular transparent sight glass having a bore of substantially the same diameter as the bore of the conduit or pipe to which the same is connected, to thereby prevent obstruction to the flow of fluid through the sight glass.

Another object of this invention is to so construct the sight flow glass that the flow through the transparent portion thereof may be readily visible through a wide angle, thus making the flow of the fluid easy to observe from different positions.

This invention also provides a device in which the flow may be observed regardless of the volume of the flow.

Also this invention contemplates having the transparent cylinder visible from opposite sides so that an illuminating means may be on one side thereof and projected through the transparent portion of the sight flow glass to the other side thereof, thereby making the flow of the fluid easier to observe.

Another object of this invention, and a very important one, is to so mount the transparent portion of the sight flow glass as to enable one to remove the same quickly for cleaning purposes and yet provide means whereby this transparent portion may be securely held in place and so held as to prevent leakage even under extremely high pressures. It is extremely important that the transparent portion of the sight flow glass be so held that no leakage can occur, and for the reason that these fittings are designed to be used with high pressures and with high vacuums.

A further object of this invention is to provide a sight flow glass which can be used for liquids which are corrosive, or volatile, as well as for liquids which are chemically neutral.

Another object of this invention resides in so securing the transparent portion of the sight flow glass in place that the pressure thereon is circumferential rather than in the direction of its length, thereby increasing the resistance against internal pressure and without putting pressure in a direction parallel to the longitudinal axis of the transparent portion which latter pressure tends to decrease the resistance against internal pressure, prevents free expansion of the glass with a rise of temperature and tends to cause leakage between the glass and packing as the glass contracts with a lowering of temperature.

Another object of this invention is to construct a sight flow glass which has the transparent portion so mounted as to permit activating light rays to be passed therethrough for the treatment of fluids or the like passing through the sight flow glass. In this case quartz glass or other suitable transparent material which will not interfere with the passage of the beneficial rays of light through the fluid, would be used.

Other objects of this invention will appear hereinafter as the description thereof proceeds, the novel features, arrangements and combinations being clearly set forth in the accompanying claims.

In the drawings.

Fig. 1 is an elevational view partly in section showing a device constructed according to my invention;

Fig. 2 is a view similar to Fig. 1 showing all of the parts in elevation and illustrating the manner in which the sight flow glass is dismantled;

Fig. 3 is a section taken on the line 3—3 of Fig. 1, and

Figure 4:
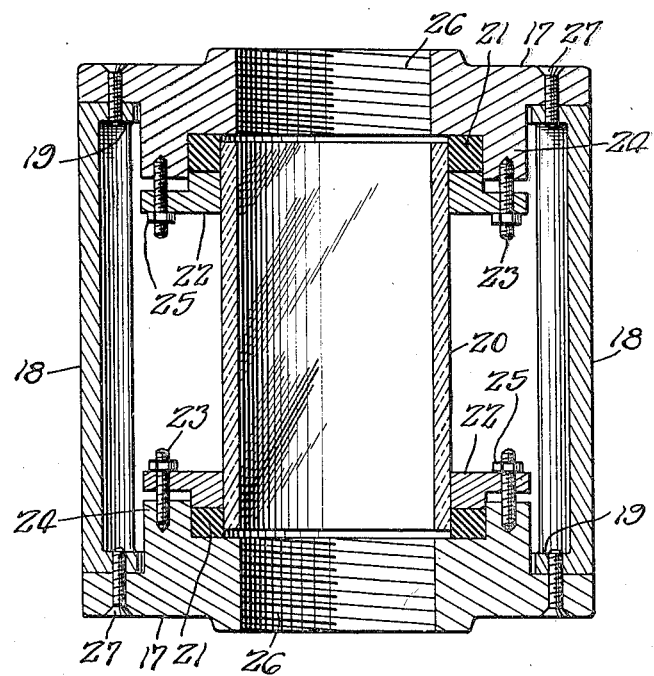
Fig. 4 shows a modification in the vertical section, through the center line thereof.

Reference numeral 1 indicates opposed conduits between which my improved sight flow glass is mounted, the sight flow glass being adapted to connect the conduits so that a continuous, uninterrupted flow may be had through the conduits and the sight flow glass. On each of the pipe sections there is threaded a flange 2, and bolts 3 pass freely through the flanges and secure the yoke designated generally as 3' in place therebetween.

The yoke is formed of a single piece of metal of the shape clearly illustrated in the drawings. It comprises base members 4 of substantially annular shape connected by opposed webs 5 which are arcuate in cross section, as is quite apparent from an inspection of Fig. 3. The webs 5 are quite strong and are preferably at least equal in strength to the conduits 1 so that if any compressive or torsional forces, or even tensional forces are applied thereto, the same will not be affected any more than the conduits 1 themselves. The webs, however, leave substantial openings therebetween to permit one to insert and remove the transparent portion of the sight flow glass in a manner to appear hereinafter.

To the base members 4 are secured the plates 6 by means of the screws 7, the screws 7 having conical heads arranged in countersunk openings 8 in the plates 6 and passing into threaded openings in the base members 4. The plates 6 have the threaded, integrally formed bosses 9 extending toward each other, and these threaded bosses are adapted to have the packing glands 10 threaded thereon. The packing glands are notched as at 11 to receive a special tool for rotating the glands or, if desired, the glands may be provided with hexagonal or multi-sided peripheries in order that a spanner wrench or the like may be used to manipulate the packing glands.

The glass cylinder 12 constructed preferably of some strong, transparent material such as quartz, or specially prepared, heat-resisting glass, has an internal bore which is substantially equal to the bore of the pipes which are threaded into the flanges 2, or a little larger than the internal diameters of said pipes so that the flow of the fluid is not restricted. It will be noted from an inspection of Fig. 1, that the internal diameter of the glass cylinder is substantially the same as the internal diameter of the opening in the bosses 9, and not substantially greater than the internal diameter of the conduits 1. The glass cylinder 12 is of a length which is less than the distance between the opposed seats 13 on the bosses 9 so that it can be inserted or removed with ease and so that in case of unequal expansion or contraction between the metal and glass parts there will be no strain placed on the glass longitudinally.

It will be noted from an inspection of Fig. 1 that there is a clearance between the glands 10 and the glass cylinder 12 which prevents the glands from binding on the cylinder.

Rubber packing rings 14 having an initial internal diameter slightly less than the outer diameter of the cylinder are stretched over the outer surface of the cylinder at each end thereof and within the threaded portions of the packing glands 10. Metal or fiber washers 15 are arranged between the rubber packing rings 14 and the packing glands 10.

When the packing glands 10 are tightened against the washers 15, the rubber rings 14 are compressed against the seats 13 of bosses 9 and against the transparent cylinder 12 thus securely sealing the joint between the seats 13 of the bosses 9 and the transparent cylinder 12, and causing a peripheral pressure on the glass cylinder 12 which holds the glass cylinder rigidly and yet prevents the leakage of fluid past the joint due to the compression of the rubber rings and to intimate contact of the rubber gaskets 14 with the external surface of the transparent cylinder 12 and with the seats 13 of bosses 9. Since the pressure on the cylinder 12 is peripheral, the glass is strengthened against internal pressures on the glass which is not the case where there is end pressure on the glass. In the latter case, the end pressure causes a strain to be put on the glass which in effect makes the glass less resistant to internal pressure.

Strips of asbestos sheet gasket packing 16 are interposed between the flanges 2 and plates 6 before the bolts 3 are put in position so that when the bolts are placed in position and tightened, a leak-proof joint will be formed between the plates 6 and the flanges 2.

It will be understood, of course, that the packing rings 14 need not be made of rubber, but may also be constructed of asbestos, flax, or other suitable packing material. It is also understood that while I use metal in constructing the yoke and preferably a metal which is not corrosive, or which is not affected by the particular fluid to be observed by the sight flow glass, I do not wish to limit my invention to any particular metal or material. For instance, compounds of phenolic condensate, hard rubber, or the like, may be used if found suitable for the requirements of the particular installation in which it is to be used.

Fig. 2 shows the ease with which this sight flow glass may be installed or removed, or a portion thereof removed for cleaning purposes. For instance, in this figure, bolts 3 are shown removed, thus permitting the yoke with the plates 6 to be slid laterally to the position shown in Fig. 2 and eventually to a position entirely free of the flanges 2.

Similarly the glands 10 are loosened and run along the glass cylinder 12 toward the center of the length thereof, as illustrated in Fig. 2, so that by a lateral movement the glands and glass cylinder may be removed bodily from between the seats 13 through the openings between the adjacent edges of the webs 5. The insertion of the glass is accomplished in a reverse manner.

In equipment of this nature, especially where there is apt to be only a relatively small amount of flow of the fluid, it is extremely difficult to see the flow if the glass is at all dirty. Therefore, unless the operator cleans the same quite frequently the usefulness thereof is impaired. Sight flow glasses generally are mounted so that they cannot be quickly removed and where such is the case, it is natural that the operator will not desire to clean the same as often as where the same can be removed quickly.

At the same time it may be that the conduits 1 are so arranged and are so acted upon by external pressures that they are urged toward each other. With the arrangement shown in the drawings it is obvious that even though the cylinder 12 is removed, the conduits 1 are held spaced from each other to the same extent as when the glass cylinder is in place and for the reason that there is normally no end pressure taken by the glass cylinder.

By having the webs 5 integral with the base portions 4, a rigid frame is produced which holds the conduits in aligned relation and prevents distortion of the sight flow glass. The webs 5, however, do not interfere with the removal of the glass cylinder 12, but provide a sufficient space for the removal of the same, together with the glands 10.

Where a continuous process is used and it is not desired to shut down the plant, or discontinue the process to clean the flow glass, duplicate sight flow glasses may be provided in parallel pipe connections, each pipe connection being provided with a shut-off valve to permit the flow through one of the sight glasses to be cut off while the flow through the other is maintained.

The webs 5 are spaced apart a considerable distance on both sides of the glass cylinder so that the glass cylinder is visible from almost any normal position from which the same may be viewed, and if desired, a light may be placed behind the glass cylinder to assist in viewing the fluid passing therethrough.

Sight flow glasses of this nature have been used in a filter press feed line with pressures up to 100 lbs. per square inch and experimental tests have shown that the glass cylinder will withstand 200 lbs. per square inch without there being any leakage past the joint of the glass cylinder and its mounting. The glass cylinders in the constructions used have been approximately 1/8" to 5/16" thick.

There is no pressure against the opposite ends of the glass cylinder, this being prevented by the webs 5 and the clearance between the ends of the glass cylinder and the seats 13. The glass can be quickly removed for cleaning and this increases the efficiency of the apparatus with which the sight flow glass is connected and for the reason that the operator will clean the same more often and will be able to visualize results better than with constructions in which the glass cannot be removed as quickly or as easily.

Applicant's device is not limited to the particular construction shown in the drawings, but is capable of being modified for various installations without affecting the patentable features thereof, and without departing from the scope of the invention. For instance in some installations, the end flanges 2 may be made integral with the plates 6 as illustrated in Fig. 4.

In Fig. 4, the end flange members 17 which take the place of the plates 6 and flanges 2 shown in Figs. 1 to 3 inclusive are connected by the webs 18, having the base members 19 similar to the corresponding parts in Figs. 1 to 3 inclusive. The transparent cylinder 20 is held in place by the packing glands 22 and packing rings 21. In this modification, the packing glands are held in place by the studs 23, screwed into the bosses 24 and passing through openings in the packing glands. Nuts 25 on the studs 23 are tightened in order to place a pressure upon the packing glands, and consequently upon the transparent cylinder 20, the same as in the first modification described. The end flange members 17 are threaded at 26 to receive conduits such as 1 in Figs. 1 to 3 inclusive. Screws 27 similar to screws 8 in Fig. 1 are used to hold the end flange members 17 in proper relation with the base members 19.

It will be understood that in either embodiment of the invention shown, either form of packing gland illustrated may be used.

It will be apparent that those skilled in the art to which this invention pertains can make various changes in the particular arrangements and constructions of the invention shown in the drawings without departing from the spirit and scope of this invention, or the scope of the appended claims.

Having thus fully described my invention, what I claim as new and desire to obtain by Letters Patent is:

1. In a sight flow glass, the combination with flanges adapted to be secured to the opposed ends of a pair of conduits, a rigid frame interposed between said flanges and secured thereto, said rigid frame having means for holding said flanges spaced from each other and for preventing their movement toward each other, a transparent conduit communicating with openings in said flanges, and means for securing said transparent conduit in place within said frame, comprising bosses forming a part of said flanges and extending toward each other, and packing glands provided with flexible packing material co-operating with said bosses and with said cylinder for holding said cylinder in communication with openings in said flanges.

2. A sight flow glass comprising end flange members adapted to be attached to adjacent ends of a conduit in which said sight flow glass is interposed, bosses on said flanges extending toward each other, a rigid frame formed in a single piece with end flanges abutting against said first mentioned flanges, and connecting portions for holding said second mentioned flanges away from each other, and as a consequence, the first mentioned flanges when said frame is interposed between said first mentioned flanges, said second mentioned flanges having openings therein for receiving said bosses, and a transparent conduit extending between said bosses and releasably secured thereto in liquid-tight engagement therewith.

3. A sight flow glass comprising a rigid frame having end flanges with openings therein and integral connecting bracing members connecting said flanges and holding them in spaced relation with each other, said bracing members being spaced apart a sufficient distance to permit of the insertion therebetween of a transparent conduit section, a transparent conduit section arranged between said flanges and between said bracing members, and means for releasably holding said transparent conduit in liquid-tight communication with said openings in said end flanges.

4. A sight flow glass comprising a rigid frame member having the ends thereof formed to co-operate with a coupling for sections of a conduit between which said sight flow glass is to be interposed, rigid connecting and spacing members forming part of said frame and extending between the ends of said frame for holding the ends thereof in predetermined spaced relation with each other and for preventing movement thereof toward each other, said bracing members being spaced from each other more than the diameter of a transparent cylinder adapted to be received within said frame to permit said cylinder to be placed in said frame and removed therefrom, said ends of said frame being formed with inwardly facing seats between which said transparent conduit is to be received and said seats being spaced inwardly toward each other above the surrounding portions of said frame, a transparent cylinder arranged between said seats, and fluid-tight connections for releasably holding said transparent conduit in juxtaposition with said seats, said transparent conduit being freely movable from said frame as soon as said releasable connections are rendered inoperative.

5. A sight flow glass comprising a pair of end flanges each having bosses extending toward each other, said bosses having openings therethrough, a rigid frame member comprising end flanges and connecting web portions between said flanges, said second mentioned flanges having openings therein adapted to receive said bosses when said first mentioned flanges are brought against said second mentioned flanges, said webs being spaced from each other a sufficient distance to permit the ready insertion of a transparent conduit therebetween, a transparent conduit arranged between said bosses and communicating with the openings therein, and releasable means for holding said conduit in liquid-tight communication with said openings in said bosses, said transparent conduit being immediately removable upon release of said releasable fluid-tight connections.

6. A sight flow glass comprising a pair of end flanges each having bosses extending toward each other, said bosses having openings therethrough, a rigid frame member comprising end flanges and connecting web portions between said flanges, said second mentioned flanges having openings therein adapted to receive said bosses when said first mentioned flanges are brought against said second mentioned flanges, said webs being spaced from each other a sufficient distance to permit the ready insertion of a transparent conduit therebetween, a transparent conduit arranged between said bosses and communicating with the openings therein, and releasable means for holding said conduit in liquid tight communication with said openings in said bosses comprising packing glands associated with said bosses and resilient packing between said packing glands and said bosses adapted to be compressed as said packing glands are moved into operative position and exert a peripheral sealing pressure against the periphery of said transparent conduit, said transparent conduit being immediately removable upon release of said releasable fluid-tight connections.

7. A sight flow glass comprising a rigid frame having end sections and connecting web sections with openings therebetween, bosses on said end sections extending toward each other and arranged between said web sections, the adjacent faces of said bosses being spaced from each other not more than the length of the openings between said web sections, and said bosses having openings therethrough adapted to be connected with adjacent sections of a conduit between which said sight flow glass is to be arranged, a transparent conduit arranged between said bosses and communicating with the openings therethrough and releasable sealing means for forming a liquid tight seal between said conduit and the openings in said bosses, said transparent conduit being readily removable from said frame through one of the openings between said web sections when said releasable sealing means is released.

8. A conduit for liquids having a transparent section releasably arranged therein comprising conduit portions connected by an enlarged frame portion with a lateral opening of a size sufficient to permit removal of a removable section therethrough, and a releasable transparent section arranged within said enlarged frame portion and of a length less than the length of said opening in said enlarged frame portion, and a liquid-tight seal between the ends of said transparent section and the adjacent portions of said conduit, said transparent section being readily removable through said opening when said releasable sealing means is released, without disturbing said enlarged frame portion.

In witness whereof, I have hereunto subscribed my name.

OSCAR H. WURSTER.